(12) United States Patent
Varma

(10) Patent No.: US 6,304,924 B1
(45) Date of Patent: Oct. 16, 2001

(54) TWO LOCK-FREE, CONSTANT-SPACE, MULTIPLE-(IMPURE)-READER, SINGLE-WRITER STRUCTURES

(75) Inventor: Pradeep Varma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/241,932

(22) Filed: Feb. 2, 1999

(51) Int. Cl.[7] ............................................... G06F 13/00

(52) U.S. Cl. ......................... 710/52; 711/110; 370/412

(58) Field of Search ........................ 710/52–57, 129–130; 711/109–110; 320/412–418

(56) References Cited

U.S. PATENT DOCUMENTS

| | | | | |
|---|---|---|---|---|
| 4,682,284 | * | 7/1987 | Schrofer | 710/55 |
| 5,671,445 | * | 9/1997 | Gluyas et al. | 710/53 |
| 5,873,089 | * | 2/1999 | Regache | 707/100 |
| 5,990,913 | * | 11/1999 | Harriman et al. | 345/521 |
| 6,038,641 | * | 3/2000 | Zangenehpour | 711/119 |
| 6,061,358 | * | 5/2000 | Nelson et al. | 370/412 |
| 6,108,692 | * | 8/2000 | Van Seters et al. | 709/213 |
| 6,151,658 | * | 11/2000 | Magro | 711/110 |

OTHER PUBLICATIONS

Lamport, L., "Specifying Concurrent Program Modules", *ACM Transactions on Programming Languages and Systems*, vol. 5, No. 2, pp. 190–222, Apr. 1983.

* cited by examiner

Primary Examiner—Christopher B. Shin
(74) Attorney, Agent, or Firm—McGuireWoods, LLP; Stephen C. Kaufman

(57) ABSTRACT

Efficient support of synchronization in parallel processing is supported by methods for building two data structures that are optimal in that they permit simultaneous access to multiple readers and one writer without using any synchronization constructs such as locks and/or any special instructions. The structures rely on atomic read and/or write of some simple integral values to an underlying, actual or emulated, shared memory. No copying is required of any reader or writer. Each structure comprises a first-in-first-out (FIFO), constant-space, circular queue in which each reader and writer tracks shared bookkeeping data such as queue pointers. Readers are impure since they too write bookkeeping data. If a position of interest for access is beyond a boundary defining legitimate access, say trying to read an empty queue or write to a full queue, then access to the position is prevented until legitimization occurs. One of the structures can use the space in its queue to full capacity. The other structure can use its queue space only to part capacity. However, it has the advantage that it is simple. It keeps only queue pointers as bookkeeping data. Each constant-space queue can be generalized straightforwardly to a lock-optimal, variable-space queue.

14 Claims, 7 Drawing Sheets

THE CIRCULAR QUEUE.  WRITTEN BUT UNREAD DATA;

DATA THAT HAS BEEN READ

TWO LOCK-FREE, CONSTANT-SPACE, MULTIPLE-(IMPURE)-READER, SINGLE-WRITER STRUCTURES

BACKGROUND OF THE INVENTION

1. Field of the Invention

The present invention generally relates to efficient support of synchronization in parallel processing and, more particularly, to methods for building instances of two novel data structures that are optimal in that they permit simultaneous access to multiple readers and one writer without using any synchronization constructs such as locks and/or any special instructions.

2. Background Description

A concurrent data structure is highly concurrent if it permits more than one request to enter and access it simultaneously. Concurrent data structures that are not highly concurrent commonly require the use of a lock at the top of the data structure to serialize access to the data structure. Locking out simultaneous access to a data structure means that excepting one, each of multiple simultaneous access requests has to either wait actively for its access turn to come, or it has to wait passively for its turn to come. In active waiting, a request wastes computation cycles by polling or spinning on some condition till the condition becomes true. In passive waiting, a request tries to reduce computation wastage by say switching to useful computation before returning to attempt data-structure access, or by yielding or context switching the processor to some other computational thread or process. The trade off between active waiting and passive waiting lies between any shifts or context-switches overhead of the latter and active-computation wastage of the former. Independent of any cost incurred by a request in waiting for its turn is the cost always incurred by the request in at least acquiring and releasing the lock associated with the data structure. The overhead of lock usage is significant, especially when multiple, simultaneous attempts at data-structure access make the lock a hot spot of contention. The costs of active waiting, passive waiting, and lock manipulation are all a part of the synchronization cost incurred by a request in accessing a concurrent data structure. Providing high concurrency in data structures as opposed to serialized access is motivated by the goal of reducing synchronization cost in parallel computation. Success in achieving high concurrency has to be measured in terms of (any) gains made in reducing overall synchronization cost, which includes waiting cost, loss of parallel-computation opportunity in data structure access, and serialization cost that includes lock and/or other synchronization-primitive overhead.

It is straightforward to provide highly-concurrent versions of purely read-only data structures. Since such a data structure does not change, it is not necessary to provide a serialization of changes to the data structure. Thus, it does not matter how many requests access the data structure at the same time. Requests accessing the data structure do not have to acquire or release any locks or use other synchronization primitives in order to access the data structure. The introduction of mutability to a data structure changes the situation completely. Unintended and possibly ill-defined mutations and readings of the data structure by interacting concurrent requests, each of which may be behaving correctly if viewed in isolation, have to be ruled out. Taking the cue from the high concurrency of read-only data structures, a step towards making a highly-concurrent version of a mutable data structure is providing a multiple-reader-single-writer version of the data structure. At most, a multiple-reader-single-writer version of a data structure allows multiple readers and one writer to access the data structure at the same time. A multiple-reader-single-writer data structure can also restrict simultaneous access to either multiple readers at one time, or one writer alone at one time. A reader can be a pure reader, which means that it does not write any shared data at all, or it can be an impure reader, which means that it does some auxiliary shared-data writes for say book-keeping purposes. A multiple-reader-single-writer structure basically supports a broadcast paradigm: One writer writes or broadcasts at one time and multiple readers receive the broadcast concurrently. Although the common multiple-reader-single-writer design often succeeds in increasing parallel access to a data structure, it does not necessarily succeed in reducing the synchronization overhead associated with that access. In fact, a multiple-reader-single-writer scheme can end up being abandoned due to an overall increase in synchronization cost due to increased overheads such as increased lock acquires and releases associated with it. See N. Carriero, "Implementation of Tuple Space Machines", *Research Report* 567, Yale University Department of Computer Science, December 1987 (also a 1987 Yale University Ph.D. Thesis).

SUMMARY OF THE INVENTION

It is therefore an object of the present invention to provide novel, highly-concurrent versions of a basic data structure, a constant-space queue, by providing two multiple-reader-single-writer versions of the data structure.

It is another object of the invention to provide, for each version, a method to build instances of the version so that the data structure instances are optimal in that they permit simultaneous access to multiple readers and one writer without using any synchronization constructs.

According to the invention, for each embodiment a first-in-first-out (FIFO) circular queue is utilized that provides increased parallel access along with an optimal lock and/or other synchronization-primitive overhead of zero lock/other primitive cost. Each version supports maximal multiple-read-single-write access by allowing both multiple readers and one writer to access inside it at the same time. The versions differ in the amount of queue memory that they can actually utilize in their operation. One version can make full use of all memory space that available in its queue, while the other version cannot make full use of all memory space that is available in its queue. The partial-space-utilizing version has the advantage that it is simple in terms of the bookkeeping effort (e.g., reader/writer pointers and manipulation) incurred by it. Prior work on providing highly-concurrent implementation of objects has often relied on the use of synchronization constructs such as locks, critical sections (A. Gottlieb, B. D. Lubachevsky and L. Rudolph, "Basic techniques for the efficient coordination of very large numbers of cooperating sequential processors", *ACM Transactions on Programming Languages and Systems*, 5(2): 164–189, April 1983, and Pradeep Varma, *Compile-Time Analyses and Run-Time Support for a Higher Order, Distributed Data-Structures Based, Parallel Language*, University Microfilms International, Ann Arbor, Mich., 1995) and monitors, or on machine-specific special instructions such as replace&add (see Gottlieb et al., supra), fetch&add and swap (M. Herlihy and J. Wing, "Axioms for concurrent objects", $14^{th}$ *ACM Symposium on Principles of Programming Languages*, pp. 13–26, January 1987), and universal primitive operations (Maurice Herlihy, "A Methodology for Implementing Highly Concurrent Data Objects", *ACM*

*Transactions on Programming Languages and Systems*, 15(5):745–770, November 1993).

In contrast, our structures rely on no synchronization constructs and/or special instructions. Our structures rely on atomicity of some reads and/or writes of simple integral values to memory that is shared, actually or by emulation, between concurrent threads/processes. Thus, our invention provides lock-free structures that are not tied to the existence of any specific primitive instructions on the machines, circuits, hardware, firmware, software and networks on which they can be built. In our structures, the waiting times of read and write requests are reduced: a reader waits primarily only when it has read all data in the queue and the writer has yet to write new data; a writer waits primarily only when it has no space left in the constant-space structure to write data into as some readers haven't yet read the data written previously by it. Thus, strictly speaking, primarily, none of our data structures impose any waiting or waiting overhead on accessing requests in order to deal with concurrency. The primary reason for any waiting by a request comes from data dependencies in the surrounding computation that lead to a filled-up queue, or an emptied-out queue from the perspective of the request. In each of our multiple-reader-single-writer structures, readers are not pure readers. For example, readers write shared data that informs a writer of the space it can reclaim for writing from the constant space available in its data structure. Thus, for each of our data structures, each simultaneous access request is a modification request of some degree.

Despite this, each of our data structures remains truly highly concurrent wherein no implicit serialization is enforced on any request. Furthermore, no copying of any data associated with a queue is required of any accessing request. In comparison, the work in Herlihy, supra, is not truly highly concurrent since it implicitly serializes modifying requests. A modifying request in Herlihy repeatedly attempts to modify a data structure until it succeeds. Modification requests in Herlihy are serialized as follows: Out of multiple modifying requests accessing a data structure at a time, only one succeeds in its attempt and others have to re-attempt at a later time. Besides imposing implicit serialization, Herlihy is also copying based: Each modification attempt by a request in Herlihy incurs the significant overhead of copying (which is aggravated further when memory contention is increased by copying) either the whole data structure being accessed, or a part of the data structure being accessed.

For each of our data structures, the choice of constant space facilitates the following: avoidance of repeated allocation costs, since memory can be pre allocated; fast addressing and fast address manipulation, since memory and memory addresses are fixed; utilization of useful patterns of locality and distance among memory blocks that takes into account communication patterns among processes/threads, since memory can be pre allocated and preferences among pre allocated memory blocks can be specified; straightforward generalization of the data structure to variable-space structures of different characteristics, since passing of pointers to variable-sized memory regions through the data structure is possible. In addition to these advantages, it is important to note that none of our data structures imposes any constraints on the type of data stored in itself. Thus, the actual data type of any data structure can include compound, non atomic types, data can be written and read using multiple instructions, and pointers can be stored and communicated through any data structure.

All of our data structures are especially suited to implementation in pervasive-computing systems and components. This is because the data structures require very little from their underlying software and hardware support systems: from hardware, no support for any special instructions and/or explicit synchronization primitives is required; from software, support required for memory allocation is straightforward and very simple, and, since the data structures are constant space, memory reclamation is built in and no support (such as garbage collection) for memory reclamation/recycling is required. Regardless of their suitability to embedded systems and low-level-support contexts, our data structures are well suited to contexts that provide a high level of support. The data structures can make extra and special use of support that might be available in high-level contexts.

BRIEF DESCRIPTION OF THE DRAWINGS

The foregoing and other objects, aspects and advantages will be better understood from the following detailed description of a preferred embodiment of the invention reference to the drawings, in which.

DETAILED DESCRIPTION OF A PREFERRED EMBODIMENT OF THE INVENTION

The invention is described in three sections. In the first section, a single-reader-single-writer version of each of our data structures is described. For each structure, a separate subsection is used for details specific to the structure. Each single-reader-single-writer structure can be used only in the context of two concurrent processes/threads, of which only one can be a reader at one time and only one can be a writer at one time. In the section that follows, our multiple-reader-single-writer structures are described. As done in the preceding section for each structure, a separate subsection is used for details specific to the structure. Each multiple-reader-single-writer structure is based on its corresponding single-reader-single-writer structure. Each multiple-reader-single-writer structure allows highly-concurrent access to multiple threads/processes, of which only one can be a writer at one time. The sections include flowcharts for all of the structures. Algorithms presented using code in this disclosure are written using the C programming language. In the third and final section, comments on the structures are provided. The comments include methods of building instances of all of the data structures provided in this disclosure.

1. Single-Reader-Single-Writer Structures

Figure 1:
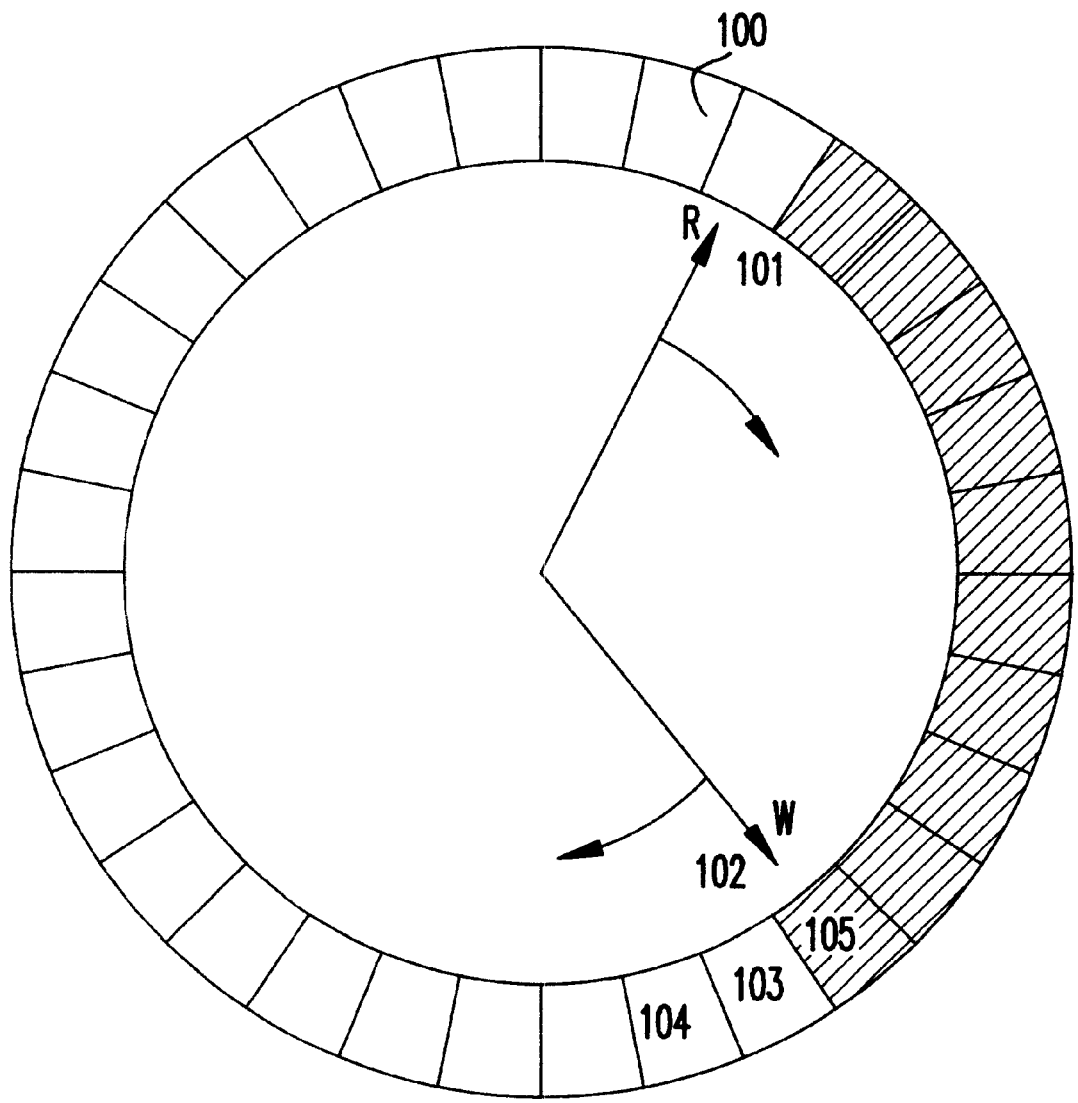
FIG. 1 is a diagram circular queue as used in the practice of the present invention.
Figure 1:
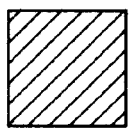
Figure 1:
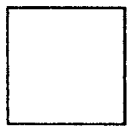

FIG. 1 describes the activities that take place in our single-reader-single-writer structures. Each single-reader-single-writer structure implements a circular queue 100 containing two pointers—a reader pointer 101, and a writer pointer 102. The reader pointer 101 denotes the reader's position in the queue. The writer pointer 102 denotes the writer's position in the queue. The reader pointer 101 chases the writer pointer 102 in the act of the reader trying to read data written by the writer up to the writer's pointer 102. The writer pointer 102 similarly chases the reader pointer 101 in the act of the writer writing new data in slots (e.g., 103, 104) (more generally, regions) that have been read by the reader. After the first non initialization setting of the writer pointer, the slot pointed by the writer at any time satisfies the invariant that it has contained relatively newly-written and fully-written data. After the first non initialization setting of the reader pointer, the slot pointed by the reader at any time satisfies the invariant that it has contained relatively newly-read and fully-read data. Relatively newly-written data means that at most one newer writing of data has occurred in whole or in part after the full writing of the relatively newly-written data.

Similarly, relatively newly-read data means that at most one newer reading of data other than the newly-read data has occurred in whole or in part after a full reading of the relatively newly-read data. Enforcement of the above invariant pair reduces the correctness of the highly-concurrent data structures to the following constraint in terms of simple boundaries defining legitimate access: The reader and writer pointers (101 and 102, respectively) are restricted—they can chase each other, but they cannot cross each other. As far as the reader is concerned, this restriction prevents the reader from attempting to read beyond the newly-written and fully-written data that the slot pointed by the writer has contained (e.g., 105). Attempting to read beyond the newly-written and fully-written data can lead to an incorrect reading, i.e., reading of unwritten data (preexisting or old, deleted data) or partially-written data from what is basically an empty queue. As far as the writer is concerned, the restriction above prevents the writer from attempting to write beyond the newly-read and fully-read data that the slot pointed by the reader pointer 101 has contained. Attempting to write beyond the newly-read and fully-read data can lead to an incorrect writing, i.e., writing over unread or partially-read data in what is basically a full queue. The pointers thus define boundaries for legitimate access that cannot be crossed. If in the process of chasing, one of the pointers catches up with the other pointer (e.g., 101 and 102), then it must wait for the other pointer to advance before advancing further. The pointer can wait either actively or passively for the other pointer to advance.

The means for preventing the crossing of boundaries by a pointer is as follows (for reader pointer). As far as the reader is concerned, it needs to take a reading of the writer pointer 102 in order not to end up crossing it. Since the writer pointer 102 can be advanced by the writer concurrently at any time, it is necessary that the reading by the reader take into account this circumstance and remain legitimate despite it. Placing a requirement that the reading/writing of reader/writer pointers be carried out atomically can guarantee that at least only legitimate pointer values will get read or written. Without atomicity, it is possible for the reader to end up reading an arbitrary/random value in place of a pointer value. The requirement of atomicity, however, cannot guarantee the freshness of the pointer reading made by the reader. The reader can end up with a value for writer pointer 102 that is one or more positions behind where the writer actually is when the reader gets the value back for processing. The method described here is conservative or safe with regard to such stale pointer readings. A stale reading can at most end up preventing the reader from accessing a position to which access has become legitimate since the time the pointer reading was taken. When a reader finds itself unable to read data from a data structure because of boundary considerations, it is supposed to attempt the access again later in the expectation that the boundary would have moved and enabled the access. The later attempt brings with itself a new reading of the writer pointer 102. This enables the reader to read the position which had previously been denied to it by a stale reading of the writer pointer 102. The means for preventing the crossing of a boundary by a writer pointer is symmetric to that for a reader pointer.

1.1 Full-Space-Utilizing Structure

Figure 2A:
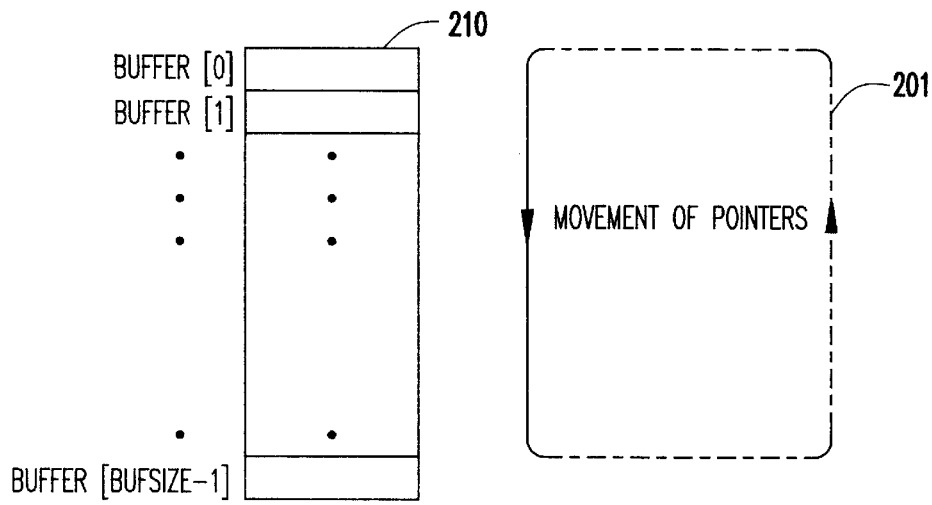
FIG. 2A is an illustration of mapping the circular queue to a linear buffer.
Figure 2B:
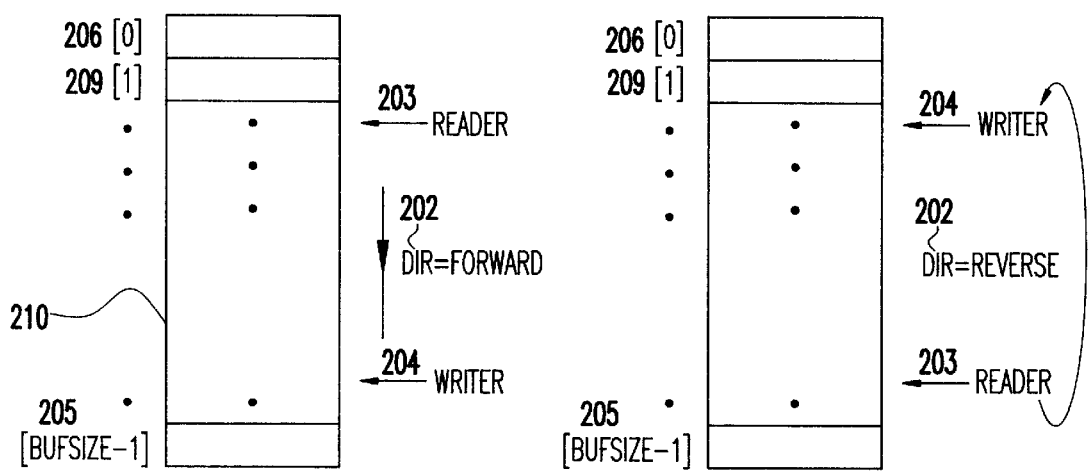
FIG. 2B is an illustration of the direction of pointer chase in the circular queue.

FIG. 2A shows the circular queue of FIG. 1 as a linear array buffer 210, of size BUFSIZE, ranging from positions 0 to BUFSIZE−1. The movement of pointers associated with the linear array buffer is also shown as circular arrow 201. FIG. 2B introduces the notion of a direction of chasing. Direction of chasing is represented by the value of a variable called dir 202. If in chasing writer pointer 204, the path of the reader pointer 203 does not jump back from buffer slot BUFSIZE−1 (205) to buffer slot 0 (206), then the direction of chasing is called FORWARD. If the reader pointer 203 has to necessarily jump back from buffer slot BUFSIZE−1 (205) to buffer slot 0 (206), then the direction of chasing is called REVERSE.

As computation through the circular queue progresses, the behavior of pointers in the linear array 210 is as follows. Initially both reader pointer 203 and writer pointer 204 are at slot 0 (206). This start is a virtual position representing that the writer has written slot 0 (206) and the reader has read slot 0 (206). The direction is set to FORWARD. The reader 203 is blocked until writer computation progresses. The writer can write to slot 1 (209). Progression in computation occurs when the writer moves ahead writing to slot 1 (209) and possibly move to successive slots. The reader pointer 203 follows the writer pointer 204, without ever crossing the writer pointer. This continues until the writer reaches buffer slot BUFSIZE−1 (205) and wraps back to buffer slot 0 (206). On doing so, the writer sets the direction, dir 202, to REVERSE. The reader pointer 203 continues moving towards buffer slot BUFSIZE−1 (205), and the writer pointer 204 now progresses towards the reader pointer 203 through the numerically increasing path slots 0, 1, 2 and so on. The writer pointer 204 never crosses the reader pointer 203 in the process. This continues until the reader pointer 203 reaches buffer slot BUFSIZE−1 (205) and crosses over to buffer slot 0 (206). The reader sets the direction 202 to FORWARD when it crosses over to buffer slot 0 (206). The situation is now the same as it was after computation started initially; that is, the writer points to a slot that is numerically the same or ahead of the reader pointer 203, the direction, dir 202, is FORWARD, and the reader pointer 203 is chasing the writer pointer 204 as the writer moves towards buffer slot BUFSIZE−1 (205). This process of pointer chasing and setting of the direction thus repeats endlessly as computation proceeds forward.

Since a reader's or a writer's pointer (203, 204, respectively) position marks the position as having been read or written, respectively, a reader or a writer chases the other's pointer by probing whether the successor of its own pointer's position can be read or written. Successor of a position, pos, is defined as (pos+1) modulo BUFSIZE, or (pos+1) %BUFSIZE using the programming language C's modulus operator. If the result of a probe is successful, then the reader or writer reads or writes the successor position and advances its pointer to that position. The probe of a successor position comprises of a test whether the position is behind the other pointer boundary or not. If the successor position is behind the other pointer boundary then the successor position can be written or read from. If the successor position is not behind the other pointer boundary, then the probing process must block pending an advance in the other pointer boundary, so that the successor position comes to be behind the boundary and thus can be written or read from. The test for successor position of a reader pointer is called rbehind and the test for successor position of a writer pointer is called wbehind. Behind is defined by a pair of definitions so as to cover the common case of successors of reader and writer pointers being behind each other simultaneously and not just the case of one being behind the other or vice versa. In this section, we give a full derivation of one of the two definitions, namely rbehind. We leave out wbehind, since its derivation is symmetric to that of rbehind. The algorithms provided later in the disclosure contain definitions of both rbehind and wbehind.

The derivation of rbehind is as follows. The derivation ignores some details that arise due to concurrency, which however are accounted for in the algorithms presented later. When direction, dir 202, is FORWARD, then the reader points to a buffer slot whose position is numerically lesser than or equal to the position of the slot pointed by the writer. The slot pointed by the writer comprises the writer's boundary. If the successor position being probed by the reader is also less than or equal to (position wise) the slot pointed by the writer, then rbehind for that successor position is true, and the reader can read the successor position. This is true for all successor positions except the successor position 0 (206). This is because when successor position is 0 (206), the reader pointer 203 is positioned at buffer slot BUFSIZE-1 (205). Since the direction is FORWARD, the writer is also positioned at buffer slot BUFSIZE-1 (205). Thus, successor position 0 (206) is ahead of the writer boundary and reading from it is not permissible. Thus, rbehind is false for successor position being 0. For all other successor positions, when the direction is FORWARD, the test for rbehind is whether successor position is less than or equal to the writer position. When the direction is REVERSE, then the writer points to a buffer slot that is numerically less than or equal to (position wise) the slot pointed by the reader. The slot pointed by the writer comprises the writer's boundary. For every reader pointer's successor position that is greater than the reader position numerically, the wrap back to buffer slot 0 (206) as a part of the modulo operator in the definition of successor has clearly not occurred. Such a position cannot cross the writer boundary as first it has to wrap back to buffer slot 0 (206). The only successor position that wraps back to buffer slot 0 (206) occurs for a reader position of BUFSIZE-1 (205). This successor can at most equal the writer position and not cross it. Thus, for no reader position, when the direction is REVERSE, the successor position of the reader pointer can cross the writer boundary. Thus, when the direction is REVERSE, rbehind is true for every successor position of reader pointer 203.

Figure 3A:
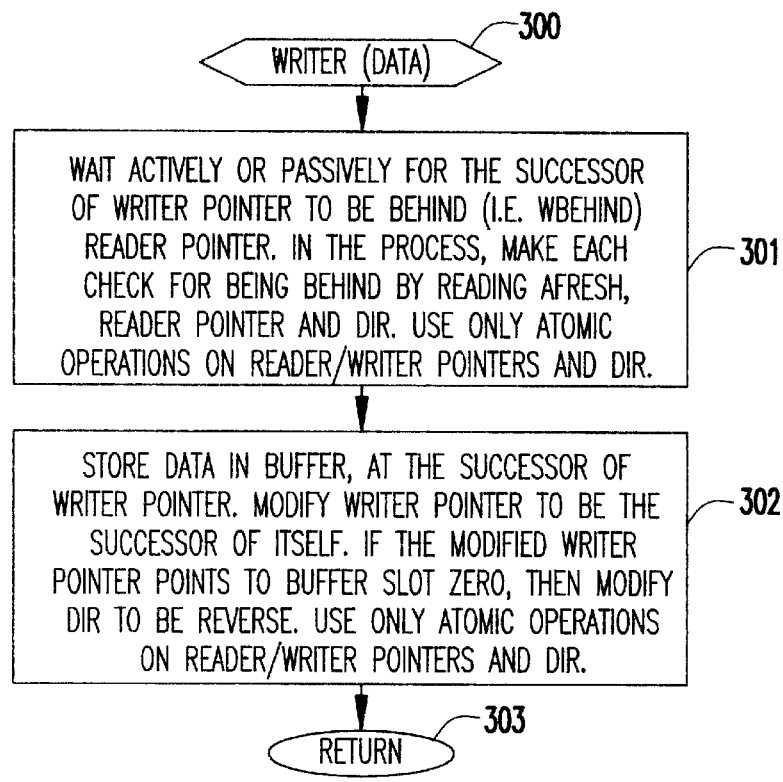
FIG. 3A is a flow diagram showing the writer process in full-space, single-reader-single-writer structure.
Figure 3B:
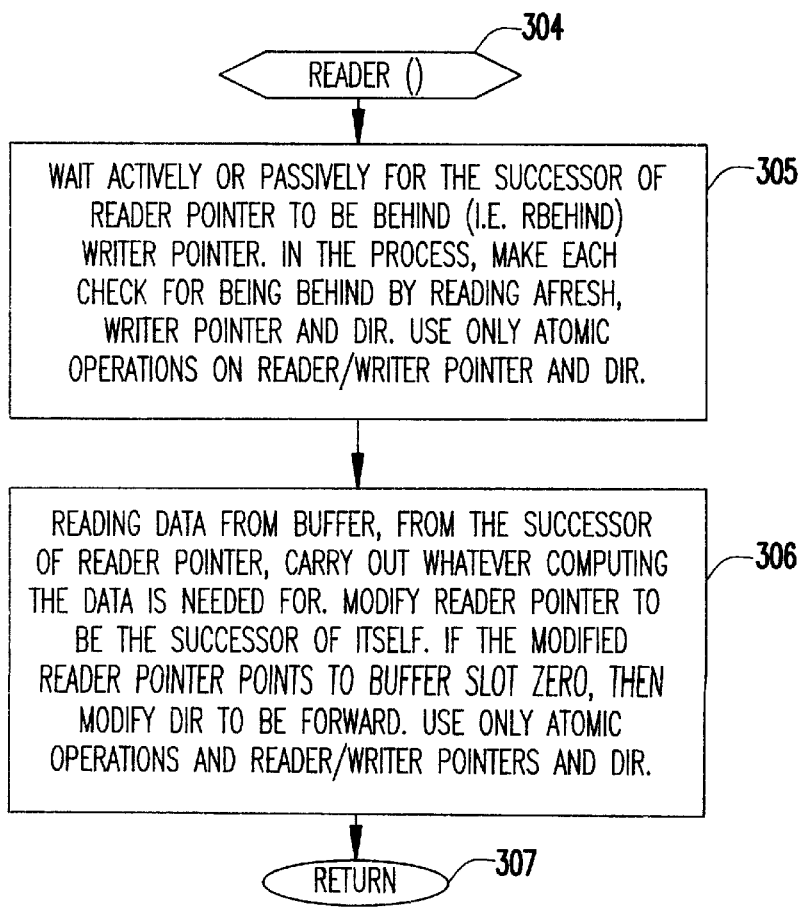
FIG. 3B is a flow diagram showing the reader process in full-space, single-reader-single-writer structure.

FIG. 3A and FIG. 3B provide the flowcharts for our full-space-utilizing, single-reader-single-writer structure, in which the operation of a writer and a reader are respectively shown. The flowcharts are more conservative and restrictive than may be necessary as far as the requirement of atomicity in operations is concerned. The requirement of atomicity is discussed further in the rest of this subsection.

As shown in FIG. 3A, the writer 300, after it enters the write routine, actively or passively waits for the successor of the writer pointer to be behind the reader pointer in function block 301. In the process, values are retrieved for each check for the successor of the writer pointer being behind the reader pointer by reading afresh in each check the reader pointer and direction. Only atomic operations are made on the reader and writer pointers and direction.

Data is stored in the shared buffer at the successor of the writer pointer in function block 302. The writer pointer is then modified to be the successor of itself. If the modified writer pointer points to buffer slot 0, then the direction is modified to REVERSE. Again, only atomic operations on reader and writer pointers and direction are permitted. The process then returns from the write routine at 303.

As shown in FIG. 3B, the reader 304, after it enters the read routine, actively or passively waits for the successor of the reader pointer to be behind the writer pointer in function block 305. In the process, fresh values are retrieved for each check for the successor of the reader pointer being behind the writer pointer by reading afresh in each check the writer pointer and direction. Only atomic operations are made on the reader and writer pointers and direction.

Data is read from the shared buffer at the successor of the reader pointer in function block 306. The reader next carries out whatever computations it needs the data for. The reader is also free to defer such computations until after it returns from the read routine in function block 307. After computations are carried out, the reader pointer is modified to be the successor of itself in function block 306. If the modified reader pointer points to buffer slot 0, then the direction is modified to FORWARD. Again, only atomic operations on reader and writer pointers, and dir are permitted. The process then returns from the read routine at 307.

The detailed algorithms for the structure are given below.

```
#define BUFSIZE . . . /* BUFSIZE and Datatype are */
typedef . . . Datatype; /* implementation specific. */ enum Direction {FORWARD, REVERSE};
volatile int wpos=0, rpos=0;
volatile enum Direction dir=FORWARD;
volatile Datatype buffer[BUFSIZE];

int succ(int pos) {return (pos+1) %BUFSIZE;} int rbehind(int a, int b, enum Direction d)
   {return d==REVERSE||a<=b && a !=0;} int wbehind(int a, int b, enum Direction d)
   {return d==FORWARD||a<=b && a !=0;} void writer(Datatype data)
{W: if (wbehind(succ(wpos), rpos, dir))
   {buffer[succ(wpos)]=data;
   wpos=succ(wpos);
   if (wpos==0) dir=REVERSE;
   }
   else goto W;}

Datatype reader(void)
{R: if (rbehind(succ(rpos), wpos, dir))
   {Datatype data;
   data=buffer[succ(rpos)];
```

```
rpos=succ(rpos);
if (rpos==0) dir=FORWARD;
return data;
}
else goto R;}
```

The structure is full-space-utilizing since it can use all its buffer space by allowing the writer to catch up with the reader pointer and writing unread data in all buffer slots. Similarly, the reader pointer can catch up with the writer pointer, leaving no unread data in buffer slots.

The algorithms for the structure are written using the C programming language. The text for the algorithms, as given above and as quoted elsewhere, uses a distinct font to distinguish it from other text. The same convention is used in the later sections concerning the multiple-reader-single-writer structures and comments.

Writer pointer or writer position at any time is given by the variable wpos. Reader pointer is given by rpos. The notion of dir is mapped to a variable dir. Wbehind and rbehind are given by functions wbehind and rbehind respectively. Successor of a position pos is given by the function succ which takes pos as an argument. The procedure writer takes an argument, data, and writes it to the circular queue.

The circular queue is implemented on a linear array, buffer, of size BUFSIZE. The choice of buffer is for concreteness. Many other data structures can be used straightforwardly. The procedure reader reads data from the circular queue. The definitions of rbehind, wbehind, and succ follow the description given for them previously. The definitions of reader and writer are more involved, so we elaborate on their definitions here.

In order to write data to the circular queue, writer first probes whether successor of wpos, succ(wpos), is available for writing. The probing is done by evaluation of wbehind (succ(wpos), rpos, dir), in the process of which rpos and dir are read. Concurrent writes to rpos and dir are possible while they are being read. Thus, the reading of rpos and the reading of dir have to each be protected by atomic operations, say by the use of atomic read operations for them. If the successor position of wpos is available, then writer executes the then branch of the outer conditional in its body. The first instruction executed in the then branch writes data to buffer at succ(wpos). There are no assumptions about atomicity of this instruction, so any type of data can be written by the instruction. Indeed, use of multiple instructions for writing data instead of the one instruction used here is allowed. This may be of use in implementations which write a relatively large amount of data in writing a slot, and the size of slots is relatively large.

The second instruction sets wpos to succ(wpos) thereby marking that data has been written up to succ(wpos). The final instruction in the then branch sets dir to REVERSE if the process of writing data has brought wpos, the current writer position, to buffer's slot 0. This brings to an end the process of writing data to the circular queue.

If on the other hand, probing succ(wpos) for writing to yields false—wbehind(succ(wpos), rpos, dir) yields false, then writer waits actively by entering a loop on the test condition. writer executes the else branch of the outer conditional in its body which sends control back to the test in the conditional. This loop continues till wbehind(succ (wpos), rpos, dir) yields true indicating that a slot has become available in which data can be written.

The choice of active waiting in the code here is for the sake of simplicity and completeness and it is not meant to imply any preference for active waiting in the data structure. An embodiment which simplifies passive waiting is for the writing process to use a variant of writer given here wherein only one attempt to write to the data structure is made. If the attempt is unsuccessful, i.e., wbehind(succ(wpos), rpos, dir) yields false, then the variant returns back to the writing process and lets the writing process decide how to loop, actively or passively.

In order to read data from the circular queue, reader probes whether the successor of the last-read slot given by rpos is available for reading from. The probing is done by evaluation of rbehind(succ(rpos), wpos, dir), in the process of which wpos and dir are read. Concurrent writes to wpos and dir are possible while they are being read. Thus, the reading of wpos and the reading of dir have to each be protected by atomic operations, say by the use of atomic read operations for them. If rbehind(succ(rpos), wpos, dir) yields true, then data is read by executing the instructions in the then branch of the outer conditional in reader's body. The first instruction executed in the then branch reads and copies data from buffer[succ(pos)] to a local variable data. There are no assumptions about atomicity of this instruction, so any type of data can be read and copied by the instruction. Indeed, use of multiple instructions for reading and copying data instead of the one instruction used here is allowed. This may be of use in implementations which read a relatively large amount of data in reading a slot, and the size of slots is relatively large.

Copying of data by a reader is neither necessary nor required. The choice of copying in the code here is for the sake of completeness and simplicity, whereby reader returns data that has been copied to the reading process. It is straightforward to have an embodiment wherein a reader instead of returning copied data simply processes the data right when it reads it from buffer (see FIG. 3B). In such processing, the reader is free to read the same data repeatedly, so long as all such readings precede the setting of rpos to succ(rpos). In reader above, copying to data is succeeded by the setting of rpos to succ(rpos). This marks that data has been read up to succ(rpos).

The third instruction sets dir to FORWARD if the process of reading has brought rpos, the current reading position, to buffer's slot 0. The fourth and the final instruction has no requirements placed on it. It returns the value of the local variable data as the result of reading the circular queue. This brings to an end the process of reading data from the circular queue.

If on the other hand, rbehind(succ(rpos), wpos, dir) yields false, then reader waits actively by entering a loop on the test condition. reader executes the else branch of the outer conditional in its body, which sends control back to the test in the conditional. This loop continues until rbehind(succ (rpos), wpos, dir) yields true indicating that a slot has become available from which data can be read.

As in the case of writer, the choice of active waiting in the code here is for the sake of simplicity and completeness. The choice is not meant to imply any preference for active waiting in the data structure. An embodiment which simplifies passive waiting is for the reading process to use a variant of reader given here wherein only one attempt to read the data structure is made. If the attempt is unsuccessful, i.e., rbehind(succ(rpos), wpos, dir) yields false, then the variant returns back to the reading process and lets the reading process decide how to loop, actively or passively.

Among all the writes carried out in the full-space single-reader-single-writer structure, no more than one write on the same variable or location takes place at one time. The data dependencies in the data structure ensure this behavior. Thus, writes do not need protection from any races with each other. Only some reads occur in concurrence with writes on the same variables or locations in the data structure. All of these reads take place on wpos, rpos and dir alone. All the places in which they occur have been mentioned explicitly in the description above. Any combination of atomic read and/or write operations that enables a safe reading of these variables is sufficient for the purpose of the data structure.

The ordering of instructions in the body of reader and writer is significant. In writer, if the setting of wpos is made to precede the writing into buffer, then the invariant for writer pointer described in the beginning of this section can be violated. Similarly, if the reading from buffer is made to succeed the setting of rpos in reader, then the invariant for reader pointer can be violated. In writer, if the conditional setting of dir is made to precede the setting of wpos, then the following can occur. Say reader is not reading the data structure, rpos has the value r, writer has written fully into buffer, dir is set to REVERSE, and is about to execute the next instruction setting wpos to 0 when it blocks (e.g. due to a context switch). Then during the time writer is blocked, reader will find itself enabled to read data from buffer, for reading from each of the slots in the sequence r+1, r+2, ..., BUFSIZE-1, 0, 1, 2, ... BUFSIZE-1 in sequence order. Similarly, the analogue of this incorrect behavior can arise in reader if the conditional setting of dir is made to precede the setting of rpos in reader.

1.2 Partial-Space-Utilizing Structure

The sequential, constant-space, circular queue given in E. Horowitz and S. Sahni, *Fundamentals of Computer Algorithms*, Computer Science Press International, Inc., (1984), can be modified to bring it into conformity with the invariant pair for reader and writer pointers of single-reader-single-writer structures described in the beginning of this section in order to make it ready for concurrent access (specifically, highly-concurrent, lock-free access). The result is a partial-space-utilizing structure, for which the flowcharts showing writer and reader operations are provided in FIG. 4A and FIG. 4B, respectively.

Figure 4A:
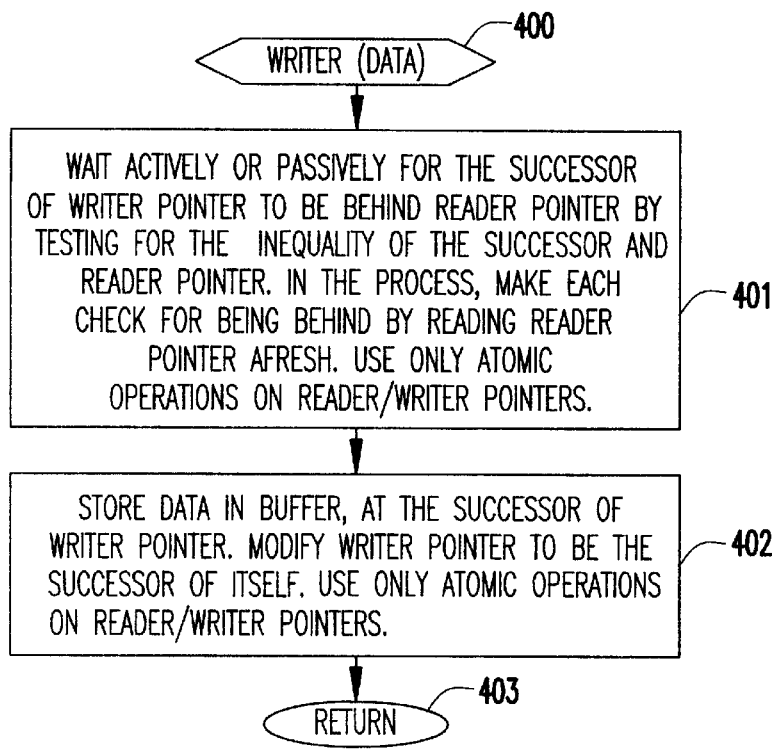
FIG. 4A is a diagram showing the writer process in partial-space, single-reader-single-writer structure.

The flowcharts are more conservative and restrictive than may be necessary as far as requirement of atomicity in operations is concerned. Requirement of atomicity is discussed further in the rest of this subsection. As shown in FIG. 4A, the writer 400, after it enters the write routine, actively or passively waits for the successor of the writer pointer to be behind the reader pointer by testing for the inequality of the successor and reader pointer in function block 401. In the process, a fresh value is retrieved from each check for the successor of the writer pointer being behind the reader pointer by reading afresh in each check the reader pointer. Only atomic operations are made on the reader and writer pointers.

Data is stored in the shared buffer at the successor of the writer pointer in function block 402. The writer pointer is then modified to be the successor of itself. Only atomic operations are made on reader and writer pointers. The process then returns from the write routine at 403.

Figure 4B:
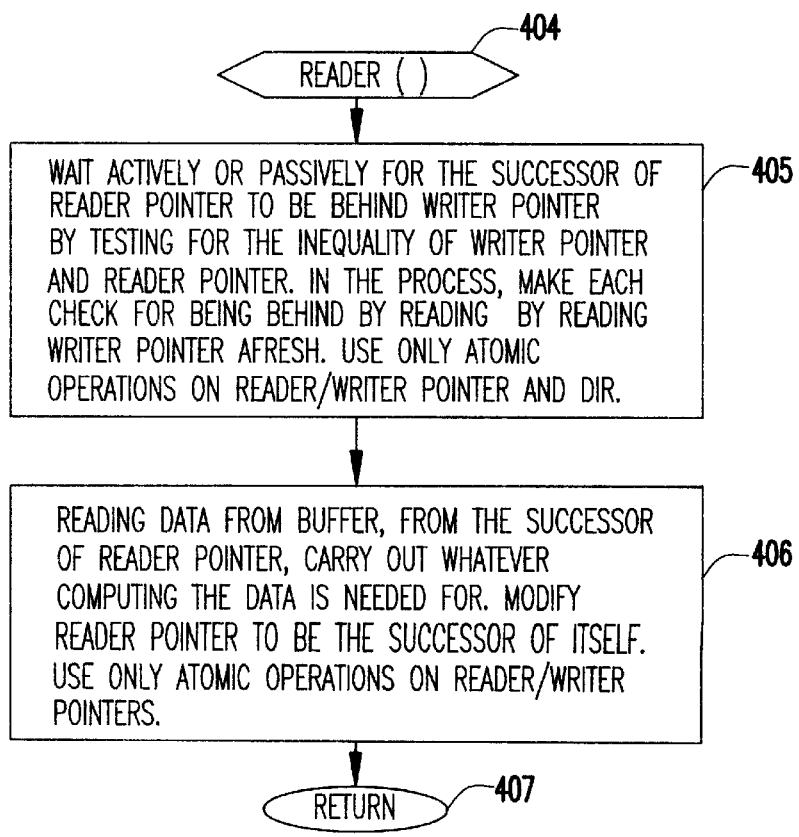
FIG. 4B is a diagram showing the reader process in partial-space, single-reader-single-writer structure.

As shown in FIG. 4B, the reader 404, after it enters the read routine, actively or passively waits for the successor of the reader pointer to be behind the writer pointer by testing for the inequality of the writer pointer and the reader pointer in function block 405. In the process, a fresh value is retrieved for each check for the successor of the reader pointer being behind the writer pointer by reading afresh in each check the writer pointer. Only atomic operations are made on the reader and writer pointers.

Data is read from the shared buffer, at the successor of the reader pointer in function block 406. The reader next carries out whatever computations it needs the data for. The reader is also free to defer such computations to after it returns from the read routine in function block 407. After computations are carried our, the reader pointer is modified to be the successor of itself. Again, only atomic operations on reader and writer pointers are permitted. The process then returns from the read routine at 407.

Detailed algorithms for the partial-space-utilizing result are as follows:

```
#define BUFSIZE ... /* BUFSIZE and Datatype are */
typedef ... Datatype; /* implementation specific. */ volatile int wpos=0, rpos=0;
volatile Datatype buffer[BUFSIZE];
int succ(int pos) {return (pos+1) %BUFSIZE;} void writer(Datatype data)
{W: if (succ(wpos)!=rpos)
   {buffer[succ(wpos)]=data;
    wpos=succ(wpos);
   }
   else goto W;
}

Datatype reader(void)
{R: if (rpos!=wpos)
   {Datatype data;
    data=buffer[succ(rpos)];
    rpos=succ(rpos);
    return data;
   }
   else goto R;
}
```

The algorithms follow the discussion and terminology of the full-space-utilizing structure presented in the last subsection. The result is obtained by changing the full-space-utilizing structure as follows: (a) drop the notion of direction of chase; (b) replace rbehind computation by a test for inequality of rpos and wpos; (c) replace wbehind computation by a test for inequality of rpos and the successor of wpos. The result is a partial-space-utilizing structure, wherein at most BUFSIZE-1 entries of data can be made before reading of data becomes necessary. In other words, the result can never have all its slot space occupied by unread data.

In writer, the reading of rpos for computing the inequality that replaces wbehind can occur in concurrence with writes on rpos. Protection for this reading by say the use of an atomic read operation for the reading is required. In reader, the reading of wpos for computing the inequality that replaces rbehind can occur in concurrence with writes on wpos. Protection for this reading by say the use of an atomic read operation for the reading is required.

Copying of data by reader in the algorithms above, is neither necessary nor required (see FIG. 4B). The choice of copying the algorithms above has the same justification as the choice of copying in the algorithm for full-space, single-reader-single-writer structure. In a manner similar to the full-space structure, an embodiment that avoids copying is straightforward.

Following the full-space structure and with the same justification as for the corresponding code in the full-space structure, the ordering of instructions in the bodies of reader and writer for the partial-space structure is significant. Similarly, following the full-space structure and with the same justification as in the full-space structure, active waiting is used in the code here of the partial-space structure. As in the full-space structure, an embodiment that simplifies passive waiting by read/write processes is straightforward.

Among all the writes carried out in the partial-space single-reader-single-writer structure, no more than one write on the same variable or location takes place at one time. The data dependencies in the data structure ensure this behavior. Thus, writes do not need protection from any races with each other. Only some reads occur in concurrence with writes on the same variables or locations in the data structure. All of these reads take place on wpos and rpos alone. All the places in which they occur have been mentioned explicitly in the description above. Any combination of atomic read and/or write operations that enables a safe reading of these variables is sufficient for the purpose of the data structure.

The inequality in the partial-space structure that replaces rbehind from the full-space structure ensures that the reader pointer never crosses writer pointer. The inequality that replaces wbehind ensures that the writer pointer never crosses the predecessor of the reader pointer. Thus the inequalities ensure the behavior that is ensured by rbehind and wbehind in the full-space structure. Indeed, the inequalities ensure a stricter behavior, since the writer pointer is never allowed to cross the predecessor of the reader pointer, instead of just the reader pointer. This extra restriction makes the structure a partial-space structure. BUFSIZE is required to be greater than one in this structure.

Besides allowing the satisfaction of the invariant pair given in the beginning of this section, the extra restriction further ensures that a stronger version of the invariant pair is satisfied. The stronger version for an invariant is obtained by replacing "has contained" in the invariant's text by "contains". A variation (not alternative embodiment) of the partial-space single-reader-single-writer structure given here follows from allowing the writer pointer to write up to the reader pointer and ensuring that it is the reader pointer that is not allowed to cross the predecessor of the writer pointer.

2. Multiple-Reader-Single-Writer Structures

We present multiple-reader-single-writer structures based on the single-reader-single-writer structures presented in the section above. In each of the multiple-reader-single-writer structures, the following is carried out: Each reader maintains a distinct reader pointer or boundary and the writer maintains the sole writer pointer or boundary.

Exactly as in the single-reader case, the writer pointer satisfies its portion of the invariant pair satisfied by the writer pointer in the single-reader-single-writer structures. Each reader pointer satisfies its portion of the invariant pair satisfied by the reader pointer in single-reader-single-writer structures. Reader pointers satisfy the invariant using the following definition of relatively newly-read data that takes as a parameter a reader pointer and its associated reader: Relatively newly-read data for a reader pointer and its associated reader means that at most one newer reading of data other than the relatively newly-read data by the associated reader has occurred in whole or in part after the full reading of the relatively newly-read data by the associated reader.

This parameterization by a reader pointer and its associated reader is not done explicitly in single-reader-single-writer structures because in any of the single-reader structures, there is only one reader pointer and associated reader to parameterize by. Readers chase the writer boundary, never crossing it, and the writer chases reader boundaries, never crossing any of them. Relying on this approach, the subsection next details a full-space multiple-reader-single-writer structure that is based on the full-space single-reader-single-writer structure. The subsection thereafter details a partial-space multiple-reader-single-writer structure that is based on the partial-space single-reader-single-writer structure.

2.1. Full-Space-Utilizing Structure

Figure 5:
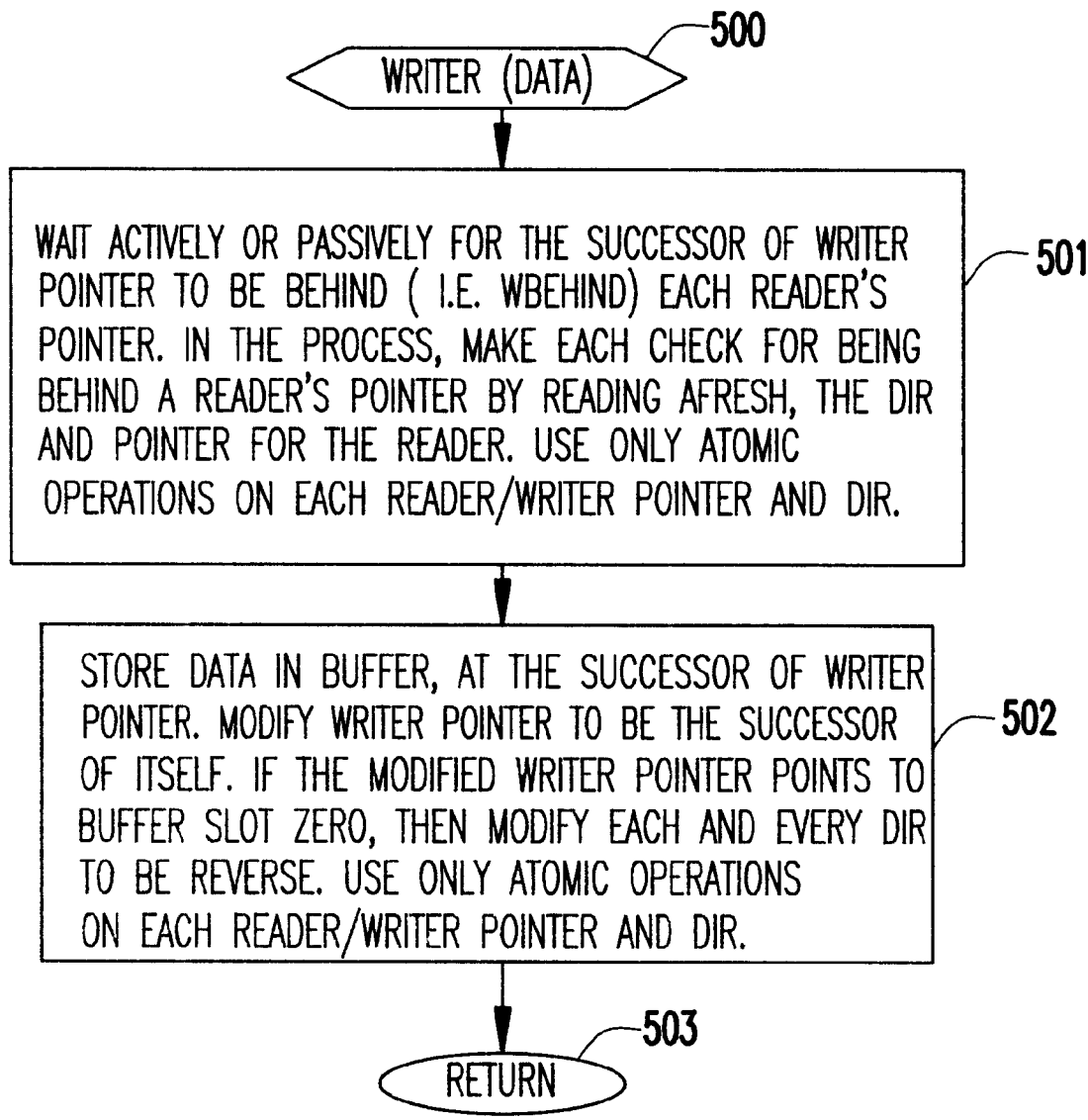
FIG. 5 is a flow diagram showing the writer process in full-space, multiple-reader-single-writer structure.

FIG. 5 provides the flowchart for the operation of a writer in our full-space multiple-reader-single-writer structure. The flowchart is more conservative and restrictive than may be necessary as far as requirement of atomicity in operations is concerned. Requirement of atomicity is discussed further in the rest of this subsection.

The operation of the reader is omitted in FIG. 5 because it is very similar to that in the single-reader full-space case. Chasing of a boundary in the multiple-reader full-space case occurs as in the full-space single-reader-single-writer case. A reader probes whether the successor of its current position is rbehind the writer boundary. If it is, then the reader reads the successor position, else it waits for the successor position to become rbehind the writer position. A writer similarly probes whether the successor of its current position is wbehind each reader's boundary. If it is, then the writer writes to the successor position, else it waits for the successor position to become wbehind each reader boundary.

As shown in FIG. 5, the writer 500, after it enters the write routine, actively or passively waits for the successor of the writer pointer to be behind each reader's pointer in function block 501. In the process, for every reader, fresh values are retrieved for each check for the successor of the writer pointer being behind the reader's pointer by reading afresh the pointer and the direction for the reader. Only atomic operations are made on the pointer and direction for each reader and the writer pointer.

Data is stored in the shared buffer at the successor of the writer pointer in function block 502. The writer pointer is then modified to be the successor of itself. If the modified writer pointer points to buffer slot 0, then each and every direction (one per reader) is modified to REVERSE. Again, only atomic operations on the writer pointer and each pointer and direction for each reader and the writer pointer.

The code for each reader is identical to the code for reader in the full-space single-reader-single-writer case, except for the use of unique names for rpos and dir. Thus, the $I^{th}$ reader, readerI, has its own dirI and rposI which are shared with the writer. Except for the name changes, readerI's code is identical to reader's code and has the same atomicity requirements and the same lack of necessity and alternatives for copying data as reader's code. Writer code differs significantly from the code for writer in the full-space single-reader-single-writer case. For N readers, the code contains N+I nested conditionals. N conditionals comprise tests for wbehind. Each of the N conditionals has the form that follows, in which I is an index ranging from 1 to N:

WI: if (wbehind(succ(wpos) rposI dirI)) . . . else goto WI

The above conditional probes whether succ(wpos) is wbehind the $I^{th}$ reader boundary. In the process, rposI and dirI are read. Concurrent writes to rposI and dirI are possible while they are being read. Thus, the reading of rposI and the reading of dirI have to each be protected by atomic operations, say by the use of atomic read operations for them.

If succ(wpos) is wbehind the $I^{th}$ reader boundary then the conditional probing the next reader boundary at the next nesting level is evaluated else control loops in active waiting at the current conditional. By the time writer evaluates N conditional tests to true, it has established that no reader boundary exists for which successor of wpos is not wbehind. The writer can thus write to successor of wpos. The writer then proceeds to write to succ(wpos) by first writing data into buffer[succ(wpos)], then setting wpos to succ(wpos) and then finally evaluating a conditional for whether wpos is 0.

If wpos is 0, then writer sets dir1 to dirN to REVERSE. As was the case in single reader single writer, writing of data is not required to be atomic, and can be done for any type, by say multiple instructions.

The code schema for writer in the full-space multiple-reader-single-writer structure is given below.

```
void writer (Datatype data)
{
W1: if (wbehind(succ(wpos), rpos1, dir1))
    W2: if (wbehind(succ(wpos), rpos2, dir2))
        W3: if ...
            .
            .
            .
                WN: if (wbehind(succ(wpos), rposN, dirN))
                    {buffer[succ(wpos)] = data;
                    wpos = succ(wpos);
                    if (wpos == 0)
                        {dir1 = REVERSE;
                        dir2 = REVERSE;
                        dir3 = REVERSE;
                        .
                        .
                        .
                        dirN = REVERSE;
                        }
                    }
                    else goto WN;
            else ...
                .
                .
                .
            else goto W2;
    else goto W1;
}
```

Figure 6:
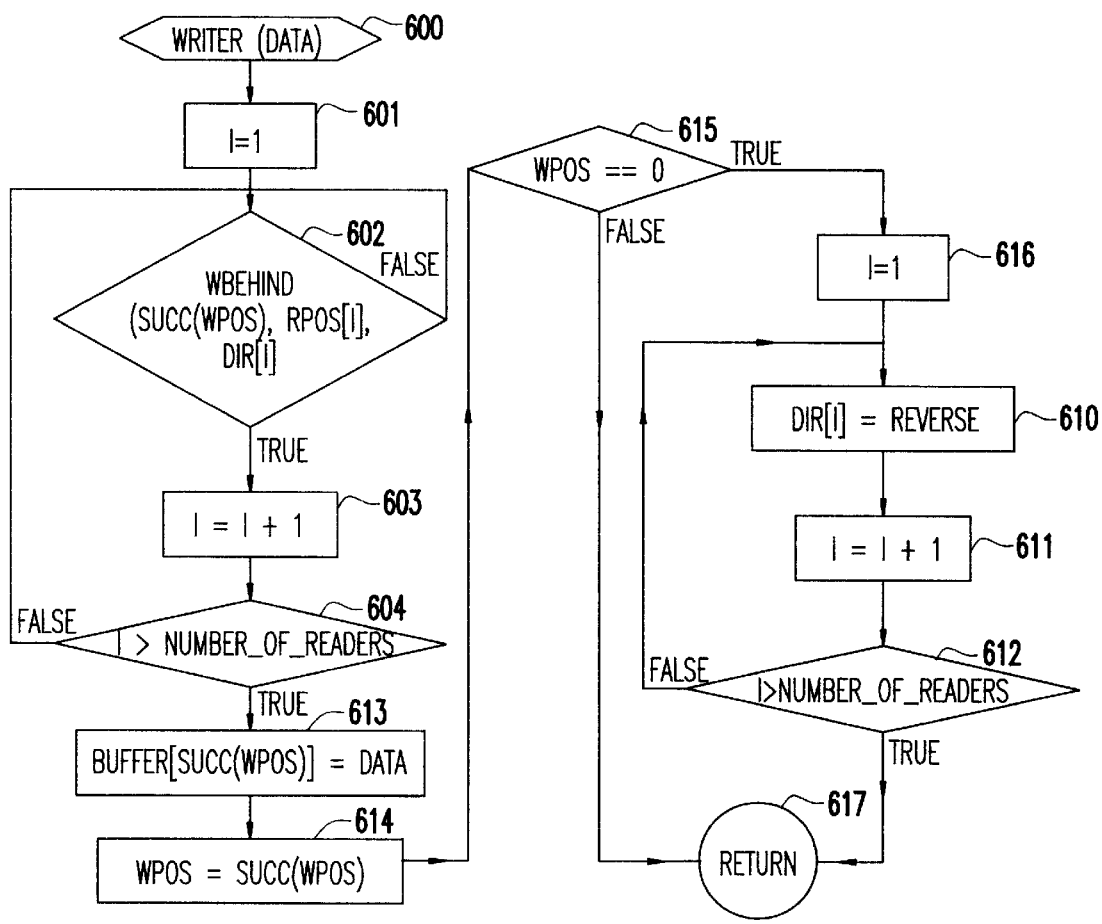
FIG. 6 is a flow diagram showing the logic of the non-open-coded writer in full-space, multiple-reader-single-writer structure.

FIG. 6 provides a detailed flowchart containing an alternative definition of the writer schema for full-space, multiple-reader-single-writer structure given above. The alternative does not rely on the test for wbehind for each reader boundary to be available as a separate code fragment—a conditional. Instead, all of the tests are collapsed into one loop over an index for readers.

In FIG. 6, variables, rposI and dirI, for readers indexed by I are replaced by one array for all rposI and one array for all dirI. The flowchart refers to rpos[I] and dir[I] instead of referring to variable names rposI and dirI for index I. For FIG. 6, the code for all readerI becomes one function reader which takes one argument, the index I of the reader. Code for reader(I) is identical to the full-space single-reader-single-writer reader except that it refers to rpos[I] and dir[I] instead of the references to rpos and dir, respectively, in reader. The flowchart also collapses the separate setting by writer of each dirI to REVERSE into one loop containing only one assignment statement.

After initializing I to 1 in function block 601, the writer probes and waits until succ(wpos) is wbehind the I$^{th}$ reader boundary in decision block 602. When this condition is true, then I is incremented in function block 603, and a determination is made whether the incremented value of I is greater than the number of readers in decision block 604. If not, the process loops back to decision block 602. If it is, the writer proceeds to write to succ(wpos) by first writing data into buffer[succ(wpos)] in function block 613, then setting wpos to succ(wpos) in function block 614. A test is then made in decision block 615 to determine whether wpos is 0. If wpos is not 0, then a return is made at 617, and the writing process ends. If wpos is 0, then writer initializes I to 1 in function block 616 before entering the direction changing loop. In the direction changing loop, dir[I] is set to REVERSE in function block 610. I is then incremented in function block 611, and a test is made in decision block 612 to determine if I is greater than the number of readers. If not, the process loops back to function block 610; otherwise, a return is made at 617.

Thus, the code contained in writer schema for full-space, multiple-reader-single-writer structure above is basically an open-coded or inlined version of the flowchart contained in FIG. 6 of which the loops over wbehind tests and setting of dir[I] are unrolled. The renaming of entities for the non open-coded scheme (FIG. 6 and reader(I)) does not change the atomicity requirements for the entities. The atomicity requirements remain the same.

Among all writes carried out in the full-space multiple-reader-single-writer structure, no more than one write on the same variable or location takes place at one time. The data dependencies in the data structure ensure this behavior. Thus, writes do not need protection from any races with each other. Only some reads occur in concurrence with writes on the same variables or locations in the data structure. All of these reads take place on wpos, rposI or rpos[I], and dirI or dir[I] alone, where I is an index as described previously. All the places in which they occur have been listed by the description above. Any combination of atomic read and/or write operations that enables a safe reading of these variables or locations is sufficient for the purpose of the data structure.

As in the case of single-reader structures, the code (and FIG. 6) for the multiple-reader-single-writer structure given above uses active waiting by the readers and the writer. As before, this is done for the sake of simplicity and completeness. It is not meant to indicate a preference for active waiting in the data structure. As in the case of the single-reader-single-writer structures, it is straightforward to use variants of readers and writer given above that shift the choice and implementation of active or passive waiting to processes using the data structure (see alternative embodiments described in the full-space-utilizing single-reader-single-writer subsection).

As in the case of the single-reader-single-writer structures, the ordering of instructions in each readerI, reader(I), and writer in the full-space multiple-reader-single-writer structure is significant. This excludes the arrangement of wbehind testing conditionals in writer, in which any order of enumerating the index I from 1 to N for the conditional form given previously can be followed.

2.2. Partial-Space-Utilizing Structure

We describe a partial-space multiple-reader-single-writer structure based on the partial-space single-reader-single-writer structure in which the multiple-reader structure has a similar relation to the single-reader structure as the relation of the open-coded full-space multiple-reader structure to the full-space single-reader structure described in the last subsection.

Figure 7:
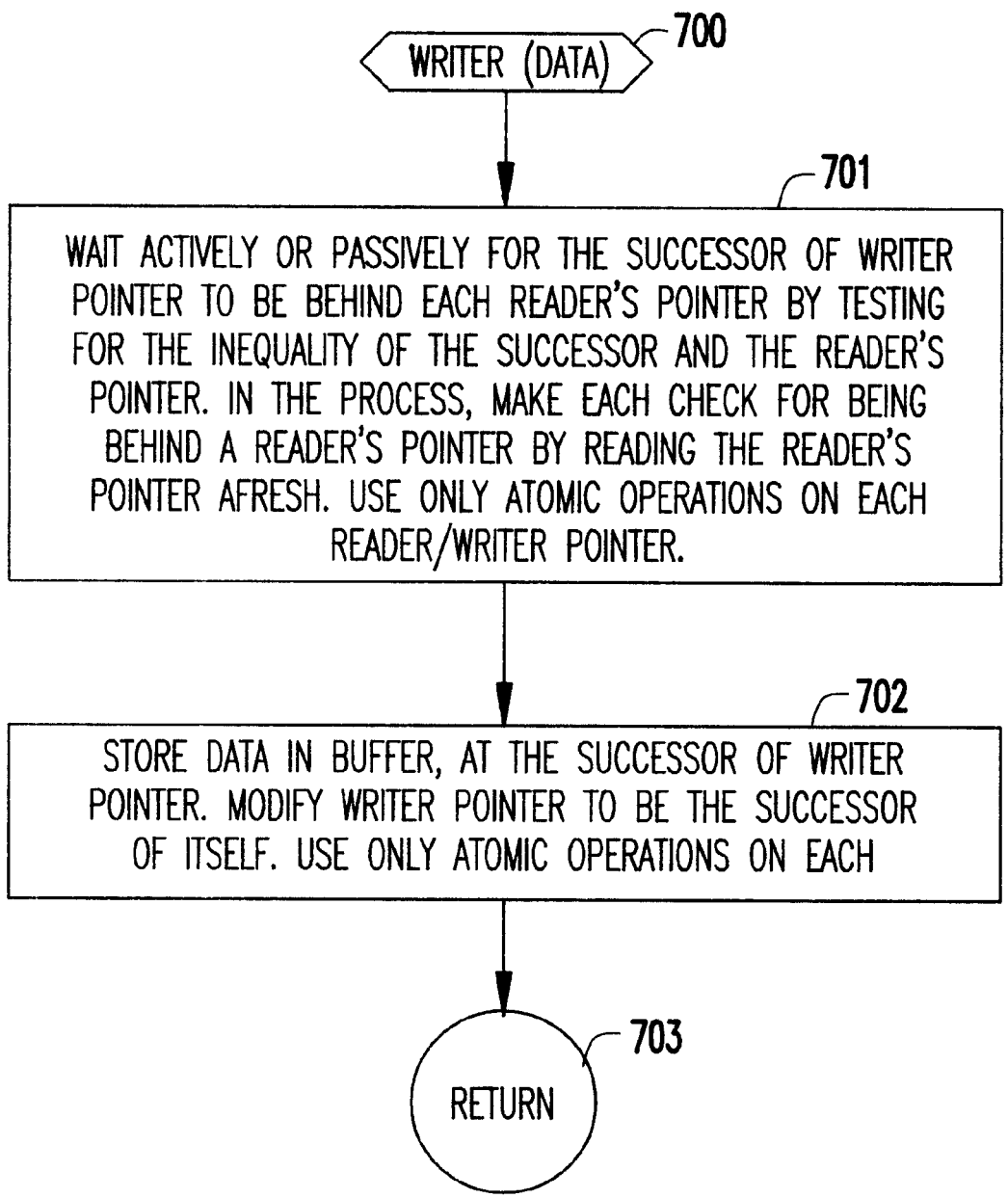
FIG. 7 is a flow diagram showing the writer process in partial-space, multiple-reader-single-writer structure.

The flowchart for the multiple-reader-single-writer partial-space structure, showing the operation of writer is contained in FIG. 7. The flowchart is more conservative and restrictive than may be necessary as far as requirement of atomicity in operations is concerned. Requirement of atomicity is discussed further in the rest of this subsection.

As shown in FIG. 7, the writer 700, after it enters the write routine, actively or passively waits for the successor of the writer pointer to be behind each reader's pointer by testing for the inequality of the successor of the writer pointer and the reader pointer in function block 701. In the process, for every reader, a fresh value is retrieved for each check for the successor of the writer pointer being behind the reader's pointer by reading afresh the pointer for the reader. Only atomic operations are made on the pointer for each reader and the writer pointer.

Data is stored in the shared buffer at the successor of the writer pointer in function block 702. The writer pointer is then modified to be the successor of itself. Again, only atomic operations on the reader pointer and the writer pointer are permitted. The process then returns from the write routine at 703.

The code for the $I^{th}$ reader, readerI, is the same as the code for reader in the partial-space single-reader structure except for the use of a unique name for rpos. In place of rpos, readerI refers to rposI. rposI is shared between readerI and the writer. Except for the change of name of rpos, readerI's code is identical to reader's code and has the same atomicity requirements and the same lack of necessity and alternatives for copying data as reader's code. Writer code differs significantly from the code for writer in the partial-space single-reader case. The code schema for writer is provided below.

```
void writer (Datatype data)
{
W1: if (succ(wpos) ! = rpos1)
        W2: if (succ(wpos) ! = rpos2)
            W3: if . . .
                .
                .
                .
                    WN: if (succ(wpos) ! = rposN)
                        {buffer[succ(wpos)] = data;
                        wpos = succ(wpos);
                        }
                        else goto WN;
                    else . . .
                .
                .
                .
            else goto W2;
        else goto W1;
}
```

For N readers, the code contains N conditionals, each having the form that follows, in which I is an index ranging from 1 to N:

WI: if (succ(wpos)!=rposI) . . . else goto WI

In processing a conditional, rposI is read. The reading of rposI can occur in concurrence with writes on rposI. Protection for this reading by say the use of an atomic read operation for the reading is required. The discussion of the conditional form is similar to the discussion of the conditional form given in the last subsection. In writer, the writing of data is not required to be atomic. The discussion of the last subsection applies to the choice of active waiting in the partial-space multiple-reader-single-writer structure.

The ordering of instructions in each readerI and writer in the partial-space multiple-reader-single-writer structure is significant. This excludes the arrangement of conditionals in writer, in which any order of enumerating the index I from 1 to N for the conditional form above can be followed. The non open-coded version of the writer schema for partial-space, multiple-reader-single-writer structure given above can be derived in a manner similar to the derivation of the non open-coded version of the open-coded, full-space, multiple-reader-single-writer structure presented previously.

Among all the writes carried out in the partial-space multiple-reader-single-writer structure, no more than one write on the same variable or location takes place at one time. The data dependencies in the data structure ensure this behavior. Thus writes do not need protection from any races with each other. Only some reads occur in concurrence with writes on the same variables or locations in the data structure. All of these reads take place on wpos and rposI alone, where I is an index as described previously. All the places in which they occur have been listed by the description above. Any combination of atomic read and/or write operations that enables a safe reading of these variables is sufficient for the purpose of the data structure.

As in the case of the partial-space single-reader structure, at most BUFSIZE−1 entries of data can be made into the partial-space multiple-reader-single-writer structure before reading of data becomes necessary. Using the definition of relatively newly-read data given in the beginning of this section, the reader pointers and the writer pointer of the partial-space multiple-reader-single-writer structure also satisfy a stronger version of the invariant pair given in the beginning of the last section. The stronger version for each invariant of the pair is obtained by replacing "has contained" in the invariant's text by "contains".

3. Comments

As detailed in the last two sections, all the data structures described in this disclosure require atomicity of reads and/or writes on writer and reader positions—wpos and rpos, rposI, and rpos[I] as applicable—at various times. The full-space structures also require the atomicity of reads and/or writes on direction of chase—dir, dir, and dir[I] (as applicable). This means that at least the specified reads and assignments on these entities have to be maintained atomic in the implementation of the data structures. This includes maintenance of atomicity across translation of the algorithms from a relatively high-level language like C to machine code.

If a compiler is used to automatically translate high-level code, then the use of the compiler has to provide the atomicity-preservation guarantee. If this is not possible, then hand translation of the appropriate portion of the source language code should be carried out in order to preserve atomicity of reads and/or writes over the above entities.

Multiple reader single writer is a broadcast paradigm in which the writer is the broadcaster. In the data structures presented here, the role of the writer is not dedicated to any single process or thread. Different processes can become the writer at different times. Thus, broadcasting can occur from different processes. However, at any given time, there can be only one broadcaster in a structure. The role of a reader is not dedicated to any process either. The same reader (i.e. say $I^{th}$ reader with a given rposI (and dirI if applicable) or rpos[I] (and dir[I] if applicable)) can be used by different processes to read a data structure. In this case, the different processes will get portions of the stream of data written to the data structure by the writer. If a process wishes to get the entire stream of data written by writer with the FIFO ordering preserved, then it can use a dedicated reader for itself and it will get the entire, ordered stream.

One of the advantages of the data structures presented in this disclosure being constant space is that addressing can be fast. This advantage is not evident in the computation presented for successor of a position. The reason is that for illustrative purposes, C's modulus operator, %, is used directly. It is straightforward to rewrite succ(pos) and use return pos==BUFSIZE-1?0: pos+1; in order to avoid the use of any of C's multiplicative operators. Implementers of the data structures presented here are encouraged to use such optimizations (and more in this case) in their implementations of the data structures. Locality can be specified to advantage in the constant-space structures. For example, in a data structure, the variables rposI and dirI are used only by the writer and the $I^{th}$ reader. By allocating them in adjacent memory, the cost of bringing them into cache memory can be reduced. By isolating them from rposJ and dirJ, where J is not equal to I, effects of cache invalidations from updates to the $J^{th}$ reader's variables can be isolated from rposI and dirI. Such isolation can be done by allocating rposI and dirI at a distance from the memory in which rposJ and dirJ have been allocated. One simple way of getting hold of memory locations and control over locality and distance in allocation is getting hold of a block of memory, or an array. Indices into the array can substitute for the variables concerned. No restrictions are placed on Datatype by the data structures. Thus, buffer can store objects of any type within itself. The objects can be compound. Reads and writes of the objects need not be atomic and can be carried out by multiple instructions. Pointers can be stored in buffer. The pointers can point to variable-size objects such as linked lists. This can effectively change any of our constant-space data structures into a variable-space data structure. In such a case, management of space of the variable-space regions pointed from buffer can include the following two methods. (a) The philosophy of our constant-space data structures is followed and an entire variable-space region is read and processed (all computations dependent on the region's contents are carried out) and/or copied (for computations that will be carried out later and that depend on the region's contents) before reader pointer is advanced to point to the slot containing a pointer to the variable-space region. In this method, a writer is free to reclaim the space of any variable-space region pointed from a slot to which it is free to advance to. This scheme of management of space in variable-space regions suits well at least low-level implementation contexts in which only a limited amount of support to the data structures can be provided. (b) If an implementation context is high level enough to provide concurrent garbage collection, then no full reading and/or copying of a variable-space region need be carried out by a reader before it advances its reader pointer from one buffer slot to another. Here the writer can simply ignore the reclamation of variable-space regions. It can leave the job to the garbage collector instead.

Finally, for each of our full-space, highly-concurrent queues, and variants, alternatives and optimized versions of our full-space, highly-concurrent queues, the building of instances of the structure can be done both manually and automatically. The method for the automatic generation of a structure instance includes a code generator that takes as input parameters relevant to the structure (e.g., buffer size, type of stored data, number of readers) and gives as output the code for the structure. The generated code can be in a form that is already integrated with the context of use of the structure and/or it can be in a form that has to be integrated separately, either manually or automatically. Multiple, dynamic instances of structures can share or reuse the same generated code, regardless of whether the code was generated manually or automatically. Given the discussion, flowcharts, and detailed algorithms for full-space structures presented previously, the task of implementing a code generator for building the structures as well as the task of implementing the structures directly by hand are both straightforward tasks. A structure that has been built can also be stored in a library for later use.

Similarly, for each of our partial-space, highly-concurrent queues, and variants, alternatives and optimized versions of our partial-space, highly-concurrent queues, the building of instances of the structure can be done both manually and automatically. The method for building such a structure parallels the method given above for full-space structures with the caveat that the prior discussion, flowcharts and detailed algorithms referred to in the paragraph above have to be replaced by the (prior) discussion, flowcharts and detailed algorithms for partial-space structures.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A method of building a highly-concurrent first-in-first-out (FIFO) queue, wherein memory space of said FIFO queue is fully utilized, and said FIFO queue permits one or more readers and one writer to simultaneously access portions of memory space of said FIFO queue without utilizing synchronization primitives and/or special instructions, the method comprising the steps of:

defining a FIFO queue in shared memory;

creating reader pointers and a writer pointer for pointing to designated memory spaces associated with said FIFO queue, wherein each said reader pointer is associated with a particular reader that reads data from said designated memory spaces of said FIFO queue, and said writer pointer is associated with a writer that writes data to said designated memory spaces associated with said FIFO queue;

defining a common direction in which said reader pointers and said writer pointer successively traverse adjacent said memory spaces;

initializing said readers and writers with respect to a common memory space of said FIFO queue, wherein said writer writes data to said common memory space and said readers read data from said common memory space;

writing new data to at least one but not greater than the number of memory spaces of said FIFO queue that are successively adjacent to and in said common direction with respect to said common memory space utilized to initialize said FIFO queue;

updating said writer pointer to point to said memory space associated with most newly written data;

utilizing atomic operations for reading data from and writing data to said memory spaces of said FIFO queue, wherein said writer actively or passively checks and waits for the successor of said writer pointer to be behind each said reader pointer and, upon satisfying this condition, said writer writes data to a memory space associated with said successor of said writer pointer, and said writer pointer is then modified to be the successor of itself; and in conjunction with said writer, said readers actively or passively checking and waiting for the successor of its associated reader pointer to be behind said writer pointer and, whereupon each reader that satisfies this condition reads data from a memory space associated with said successor of each said reader's pointer, computations being performed with said data, and each said reader's pointer is then being modified to be the successor of itself.

2. A method according to 1, wherein said FIFO queue is constant space.

3. A method according to claim 2, wherein said FIFO queue is a circular queue.

4. A method according to claim 2 wherein said FIFO queue is a linked list.

5. A method according to claim 1, wherein said FIFO queue is a variable-space data structure.

6. A method according to claim 5, wherein said FIFO queue is a circular queue.

7. A method according to claim 5, wherein said FIFO queue is a linked list.

8. A method of building a highly-concurrent, first-in-first-out (FIFO) queue, wherein memory space of said FIFO queue is not fully utilized, and said FIFO queue permits one or more readers and one writer to simultaneously access portions of memory space of said FIFO queue without utilizing synchronization primitives and/or special instructions, the method comprising the steps of:

defining a FIFO queue in shared memory;

creating reader pointers and a writer pointer for pointing to designated memory spaces associated with said FIFO queue, wherein each said reader pointer is associated with a particular reader that reads data from said designated memory spaces of said FIFO queue, and said writer pointer is associated with a writer that writes data to said designated memory spaces associated with said FIFO queue;

defining a common direction in which said reader pointers and said writer pointer successively traverse adjacent said memory spaces;

initializing said readers and writers with respect to a common memory space of said FIFO queue, wherein said writer writes data to said common memory space and said readers read data from said common memory space;

writing new data to at least one but less than the number of memory spaces of said FIFO queue that are successively adjacent to and in said common direction with respect to said common memory space utilized to initialize said FIFO queue;

updating said writer pointer to point to said memory space associated with most newly written data;

utilizing atomic operations for reading data from and writing data to said memory spaces of said FIFO queue, wherein said writer actively or passively checks and waits for the successor of said writer pointer to be behind each said reader pointer by testing for the inequality of said successor of said writer pointer and said reader pointer and, upon satisfying this condition, said writer writes data to a memory space associated with said successor of said writer pointer, and said writer pointer is then modified to be the successor of itself; and in conjunction with said writer, said readers actively or passively checking and waiting for the successor of its associated reader pointer to be behind said writer pointer by testing for the inequality of said successor of said reader pointer and said writer pointer and, whereupon each reader that satisfies this condition reads data from a memory space associated with said successor of each reader's pointer, computations being performed with said data, and each said reader's pointer is then being modified to be the successor of itself.

9. A method according to 8, wherein said FIFO queue is constant space.

10. A method according to claim 9, wherein said FIFO queue is a circular queue.

11. A method according to claim 9, wherein said FIFO queue is a linked list.

12. A method according to claim 8, wherein said FIFO queue is a variable-space data structure.

13. A method according to claim 12, wherein said FIFO queue is a circular queue.

14. A method according to claim 12, wherein said FIFO queue is a linked list.

* * * * *